(12) United States Patent
Kim et al.

(10) Patent No.: US 11,332,204 B2
(45) Date of Patent: May 17, 2022

(54) AUGMENTED TIRE TRACTION SYSTEM FOR TWO-WHEELED VEHICLE

(71) Applicant: Lit Motors Corporation, San Francisco, CA (US)

(72) Inventors: Daniel Kee Young Kim, San Francisco, CA (US); David Arthur Bailey, Glendale, AZ (US)

(73) Assignee: Lit Motors Corporation, Portland, OR (US)

( * ) Notice: Subject to any disclaimer, the term of this patent is extended or adjusted under 35 U.S.C. 154(b) by 184 days.

(21) Appl. No.: 16/499,833

(22) PCT Filed: Mar. 30, 2018

(86) PCT No.: PCT/US2018/025571
§ 371 (c)(1),
(2) Date: Sep. 30, 2019

(87) PCT Pub. No.: WO2018/183962
PCT Pub. Date: Oct. 4, 2018

(65) Prior Publication Data
US 2020/0102027 A1    Apr. 2, 2020

Related U.S. Application Data

(60) Provisional application No. 62/479,202, filed on Mar. 30, 2017.

(51) Int. Cl.
*B62D 37/06*    (2006.01)
*B60W 40/13*    (2012.01)
(Continued)

(52) U.S. Cl.
CPC .............. *B62D 37/06* (2013.01); *B60W 40/13* (2013.01); *B62D 35/00* (2013.01); *B62J 45/412* (2020.02);
(Continued)

(58) Field of Classification Search
CPC ........ B62D 37/06; B62D 35/00; B62D 37/02; B60W 40/13; B60W 2040/1315;
(Continued)

(56) References Cited

U.S. PATENT DOCUMENTS 5,820,439 A    10/1998    Hair, III
7,006,901 B2    2/2006    Wang
(Continued)

FOREIGN PATENT DOCUMENTS

DE    2518574 A1    11/1975
EP    1563716 A2    8/2005
(Continued)

OTHER PUBLICATIONS

Extended European Search Report for European Patent Application No. 1877005.2, dated Dec. 16, 2020, 11 pages.
(Continued)

*Primary Examiner* — Scott A Reinbold
(74) *Attorney, Agent, or Firm* — Elliott, Ostrander & Preston, P.C.

(57) ABSTRACT

An augmented traction system for a two-wheeled vehicle comprising a CMG (control moment gyroscope) system including a plurality of CMGs to provide a first torque vector to decrease a roll angle of a turn of the vehicle and to increase force on one or more of the tires of the vehicle on a road surface, a steering system for the vehicle, the steering system to determine a steering control for the turn of the vehicle at a particular vehicle speed and roll angle, based on sensor data, and an aerodynamic control system to actuate one or more aerodynamic elements of the vehicle, the one or more aerodynamic elements to provide a second torque vector to decrease the roll angle of the vehicle.

4 Claims, 4 Drawing Sheets

(51) Int. Cl.
*B62D 35/00* (2006.01)
*B62J 45/412* (2020.01)
*B62J 45/414* (2020.01)
*B62J 45/415* (2020.01)
*B62J 99/00* (2020.01)
*B62J 50/22* (2020.01)

(52) U.S. Cl.
CPC ......... *B62J 45/414* (2020.02); *B62J 45/4151* (2020.02); *B62J 99/00* (2013.01); *B60W 2040/133* (2013.01); *B60W 2040/1315* (2013.01); *B60W 2300/36* (2013.01); *B62J 50/22* (2020.02)

(58) Field of Classification Search
CPC ......... B60W 2040/133; B60W 2300/36; B62J 99/00; B62J 45/40; B62J 45/4151
See application file for complete search history.

(56) References Cited

U.S. PATENT DOCUMENTS

| 2004/0098185 A1* | 5/2004 | Wang | B62D 37/06 |
| | | | 701/70 |
| 2013/0238233 A1* | 9/2013 | Kim | B60W 30/09 |
| | | | 701/301 |
| 2013/0274995 A1* | 10/2013 | Kim | B62J 27/00 |
| | | | 701/36 |
| 2014/0054867 A1 | 2/2014 | Kim et al. | |

FOREIGN PATENT DOCUMENTS

| JP | 2006513075 A | 4/2006 |
| JP | 2008024235 A | 2/2008 |
| JP | 2013522108 A | 6/2013 |
| JP | 2020515469 A | 5/2020 |
| WO | 2011115699 A1 | 9/2011 |

OTHER PUBLICATIONS

International Preliminary Report on Patentability for International Patent Application No. PCT/US2018/02557, dated Oct. 1, 2019, 10 pages.
International Search Report and Written Opinion for International Patent Application No. PCT/US2018/025571, dated Jul. 20, 2018, 12 pages.
Notification of Reason for Rejection for Japan Patent Application No. 2020-515469, dated Dec. 1, 2021, 19 pages.

* cited by examiner

AUGMENTED TIRE TRACTION SYSTEM FOR TWO-WHEELED VEHICLE

This application claims priority to U.S. provisional patent application No. 62/479,202, entitled Augmented Traction System for Two-Wheeled Self-Balancing Vehicle, filed Mar. 30, 2017, the entire contents of which are incorporated herein by reference.

FIELD OF THE INVENTION

Embodiments of the invention generally pertain to transportation vehicles, and more particularly to an augmented tire traction system for a two-wheeled vehicle, for example, a two-wheeled self-balancing vehicle.

BACKGROUND

A vehicle, such as a Formula 1 (F1) race car platform, uses an aerodynamic advantage to exceed the natural friction and gravitational force limits of aerodynamically unaided tire and road interactions. By adding a downward force induced by spoilers on the nose and tail of the F1 car, the maximum speeds at the apex of turns are significantly higher than performance motorcycles and aerodynamically unaided performance cars. This decreases the lap times of F1 cars significantly, as is evidenced by the fact that they hold the fastest lap times around race tracks worldwide, and more generally increases tire traction on a road surface in higher speed turns.

Although two-wheeled motorcycles inherently weigh less and have a higher power to weight ratio than automobiles, motorcycles are generally limited to 20-25% slower lap times due to the lack of an aerodynamically induced traction advantage F1 cars have. For example, the fastest F1 lap times at Silverstone raceway is: 1:34.661, as opposed to the Grand Prix motorcycle racing (MotoGP) fastest lap time of 2:02.888.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Figure 1:
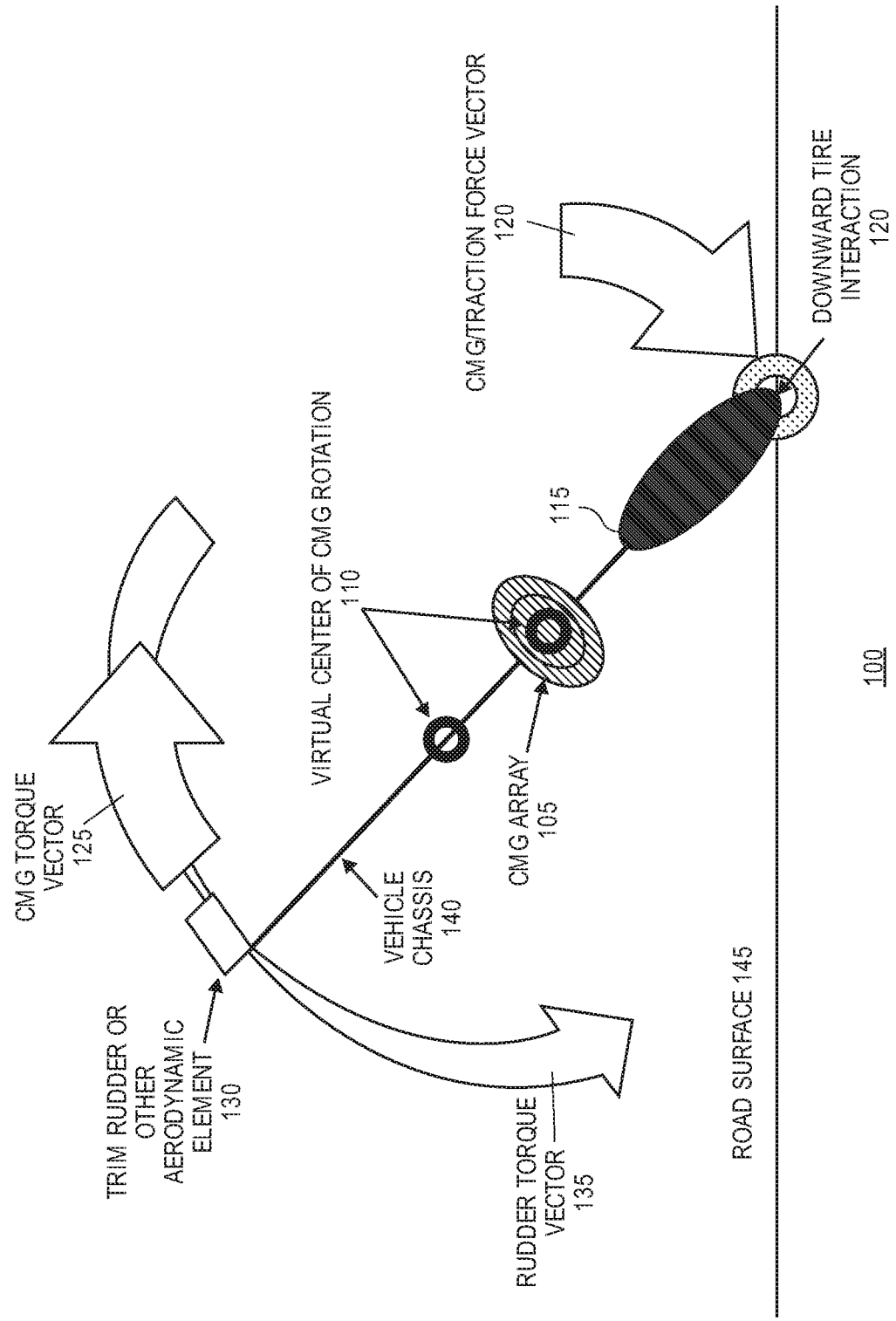
FIG. 1 is diagram of forces on a two-wheeled vehicle for traction augmentation according to an embodiment of the invention.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DETAILED DESCRIPTION

Embodiments of the invention describe methods, apparatuses, and systems for control of an augmented tire traction system for a two-wheeled vehicle. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

A "control moment gyroscope" or "CMG" refers to a gyroscope (or, simply, "gyro") applied for attitude control of rigid bodies (traditionally used in satellites and spacecraft). Attitude control refers to controlling the orientation of an object with respect to an inertial frame of reference, or another entity including a nearby object. Gyroscopes are angular momentum storage elements built around a rotating flywheel, wherein the flywheel acts as a torque actuator, and rotating the angular momentum vector produces a torque in the direction of rotation and perpendicular to the angular momentum vector. A control moment gyroscope (CMG) is an attitude control device generally used in vehicle attitude control systems, such as spacecraft. A CMG consists of a spinning rotor and one or more motorized gimbals that tilt the rotor's angular momentum. As the rotor tilts, the changing angular momentum causes a gyroscopic torque that rotates the vehicle.

In some embodiments, a CMG Augmented Traction System (CATS) increases tire traction on a road surface for a two-wheeled vehicle (e.g., a motorcycle or bike) by utilizing multiple cooperative control systems, wherein the multiple control systems include a gyroscopic stability system utilizing one or more CMGs (or "CMG array") for the two-wheeled vehicle (hereinafter a "CMG system"), and one or more of an aerodynamic control system to actuate one or more aerodynamic elements or surfaces for the two-wheeled vehicle, and a steering system that comprises of a purely mechanical linkage steering system, or a drive-by-wire steering system, to provide steering for the two-wheeled vehicle. As used herein, the term drive by wire steering system, or steer-by-wire system refers generally to use of electrical or electrical-mechanical (electromechanical) systems for steering.

In some embodiments, the multiple control systems further include a counter balancing control system to provide a counterweight to create a biased disequilibrium to bias the CMGs such that there is more dynamic range in the CMG array for use of the turn of the two-wheeled vehicle.

In some embodiments, the CMG system, the aerodynamic control system, and the steering system jointly operate to provide the augmented tire traction for a two-wheeled vehicle.

In some embodiments, a steer-by-wire system is to generate steering controls for a bike in a turn, the turn including a particular roll angle; a CMG system is utilized to provide a torque on the bike while in the turn, the torque providing torque counter to the centrifugal torque to reduce the roll angle of the bike while in the turn; and an aerodynamic control system is to generate a aerodynamic force, e.g., lift, to force the bike downward and increase the available cornering force range of the bike while in the turn, and thus counteract the roll angle reduction caused by the CMG system. In some embodiments, the combination of the control systems enables augmented tire traction on a road surface for a two-wheeled vehicle.

In some embodiments, to initiate an augmented traction turn, the CMG system is to "load" the CMG array with a bias in the opposite direction of the turn to initiate a turn, but without surpassing the precession margin needed to maintain control entering the turn. In this manner, the vehicle operates to extend the precession budget or margin of saturation of angular momentum while retaining the ability to recover from the turn. This loading of the CMG array with a directional bias is used to increase duration or capacity of augmented traction. To load the CMGs, the vehicle utilizes either or both of the aerodynamic control, and the roll bias of the vehicle.

In some embodiments, an additional counter balancing system includes a bias ballast to provide a counter weight to create biased disequilibrium in the opposite direction of the desired turn. The bias ballast allows the gyros to precess and create a larger margin of saturation to roll the vehicle in the desired direction and increase the duration or capacity of augmented traction. Precess, or precession, as that term is used herein, refers to a change in the orientation of the rotational axis of a rotating body, in this case, a change in the orientation of the rotational axis of one or more of the CMGs.

In some embodiments, the aerodynamic control system for a two-wheeled vehicle includes one or more aerodynamic elements, and a control element to control the actuation of the one or more aerodynamic elements. In some embodiments, the one or more aerodynamic elements may include a passive aerodynamic element, such as any surface or structure to generate aerodynamic force, e.g., lift (for example, a rudder, aileron, vehicle body, or other similar aerodynamic element); an active aerodynamic element, such as any mechanism to generate forced air (for example, a jet turbine or other similar device); or combination of passive and active aerodynamic elements. In some embodiments, the aerodynamic system provides a downward force to a bike in a turn through activation of the one or more aerodynamic elements.

Using aerodynamic controls to dictate the roll axis and lean or tilt the vehicle into a turn for the augmented traction mode, the aerodynamic element tends to roll the vehicle past the desired lean or tilt angle (trim condition) given a specific radius of turn and speed. "Over roll" of the attitude of the vehicle state is a force created by the horizontal and downward force vectors to cause the vehicle to lean downward past the desired trim condition.

In some embodiments, additional vehicle attitude control is governed by the gyro stability system actuated by a CMG Array (including two or more CMGs) using a plurality of sensors on a sensors network, motors and motor controllers on an actuator network, central CPUs in a closed loop control model, and powered by an onboard power supply. The system operates to counter roll the vehicle with an opposite upward and horizontal force into an optimal trim condition for the designated turn radius. This counter roll of the CMG stability system during a turn rotates at a virtual roll center around the center of gravity (CG) of the vehicle. During this stability process a rotational force is transferred through the vehicle frame and at the virtual roll center of the vehicle, the contact point between the vehicle tires and ground surface, and a downward and horizontal force is imparted on the tires increasing the vehicle's tire-to-ground coefficient of friction. The higher coefficient of friction yields an increase in traction in turns and enables the vehicle to maintain higher speeds or increased stability on loose surfaces.

FIG. 1 is diagram 100 of forces on a two-wheeled vehicle for traction augmentation according to an embodiment of the invention. In some embodiments, a two-wheeled vehicle includes a CMG array 105 fixed to vehicle chassis 140, the CMG array to provide a roll torque centered around the center of gravity 110 of the vehicle, thereby generating a CMG/traction force vector, a downward force vector, on the tires 115 of the vehicle, which acts to increase tire interaction (120) on the road surface 145, and further provides a upward torque vector 125 that acts against the intended lean of the vehicle in a turn. In some embodiments, a trim rudder or other aerodynamic element 130 provides an additional torque vector 135 downward, thereby counter-balancing the CMG torque vector 125.

Figure 2:
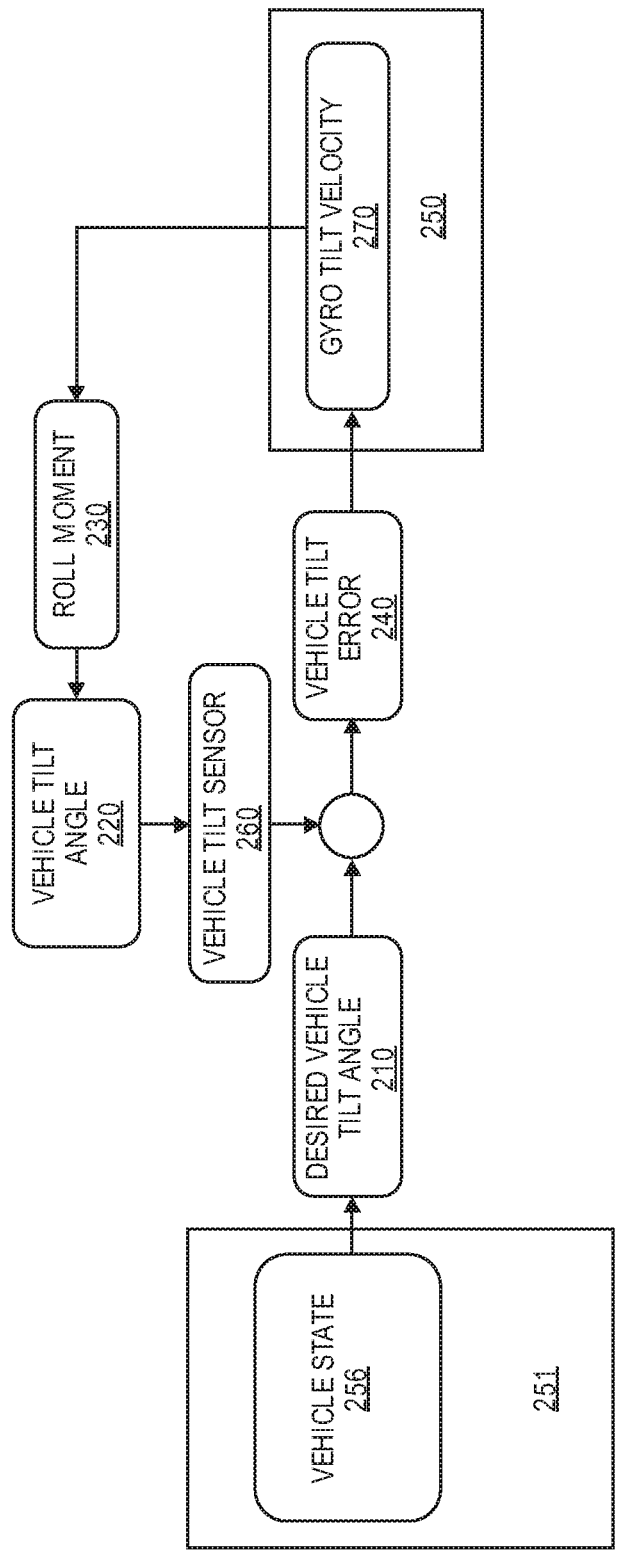
FIG. 2 is an illustration of a control system for a two-wheeled vehicle according to an embodiment of the invention.

FIG. 2 is an illustration of a control system for a two-wheeled vehicle according to an embodiment. In some embodiments, a vehicle state processor 251 utilizes a current vehicle state 256 (including one or more of steering angle, horizontal acceleration, and forward velocity) to determine the vehicle's proper lean or tilt angle range 210 for the current conditions and compares this to the vehicle's current lean or tilt angle 220 (including roll moment 230) utilizing vehicle tilt sensor 260 to determine the vehicle tilt error 240. The vehicle tilt error is utilized by a gyro control processor 250 to determine the required precession axis input to the gyro(s) in the CMG system to produce sufficient counter-torque, gyro tilt velocity 270, to return to or maintain the vehicle within desired tilt angle range 210.

In some embodiments, the sensors for the vehicle include flywheel state sensors coupled to each gyro's flywheel, vehicle inertial state sensors 570, vehicle absolute state sensors 580, and vehicle state sensors 590, that provide additional data for enhancing the stability and agility of the vehicle. (FIG. 5).

Figure 3:
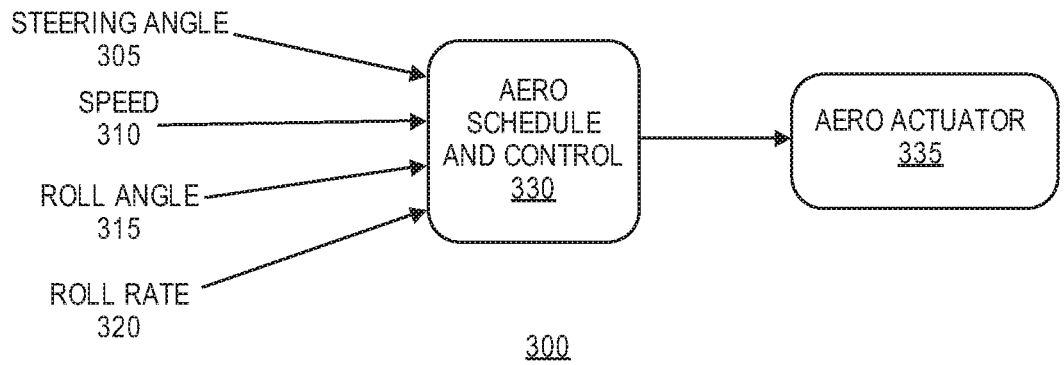
FIG. 3 is an illustration of an aerodynamic control system for a two-wheeled vehicle according to an embodiment of the invention.

FIG. 3 is an illustration of an aerodynamic control system 300 for a two-wheeled vehicle according to an embodiment. In some embodiments, factors for aerodynamic control include steering angle 305 of the vehicle, speed 310 of the vehicle, roll angle 315 of the vehicle, and roll rate 320 of the vehicle. In some embodiments, a process generates aerodynamic schedule and control 330 based on such factors. In some embodiments, an aerodynamic actuator 335 is to actuate an aerodynamic element, such as a rudder, aileron, or vehicle body shape, in response to the aerodynamic schedule and control 330. In some embodiments, the aerodynamic element is to provide a force vector downward (to provide additional traction) to counter the CMG vector.

Figure 4:
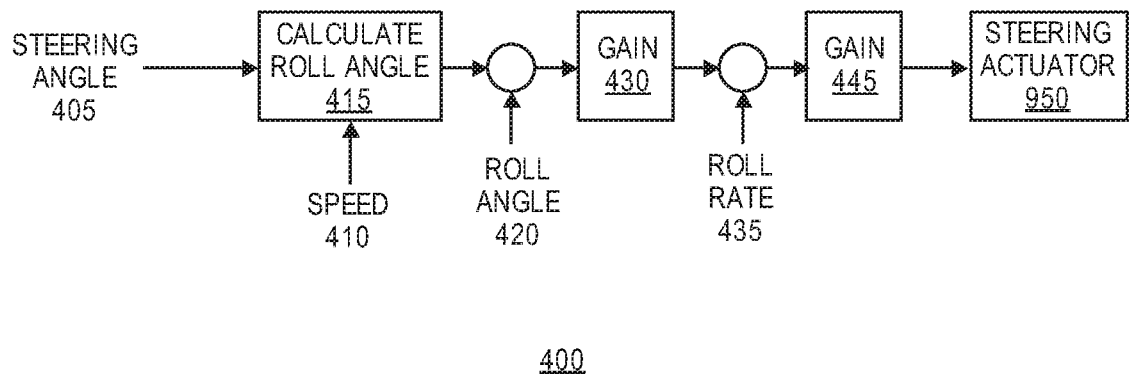
FIG. 4 is an illustration of steering by wire control system for a two-wheeled vehicle according to an embodiment of the invention.

FIG. 4 is an illustration of steer-by-wire steering system 400 for a two-wheeled vehicle according to an embodiment. In some embodiments, a processor or controller of a two-wheeled vehicle is to calculate a roll angle 415 based on a steering angle 405 and a speed 410 for the vehicle. In some embodiments, an actual roll angle 420 is compared at 425 with the calculated roll angle 415. In some embodiments, a result of the comparison is multiplied by a first gain factor at 430 and compared at 440 with a roll rate 435. In some embodiments, the result of the comparison 440 with the roll rate 435 is multiplied times a second gain factor at 445, with the result being provided to a steering actuator 450 to control a steering amount for the vehicle.

Figure 5:
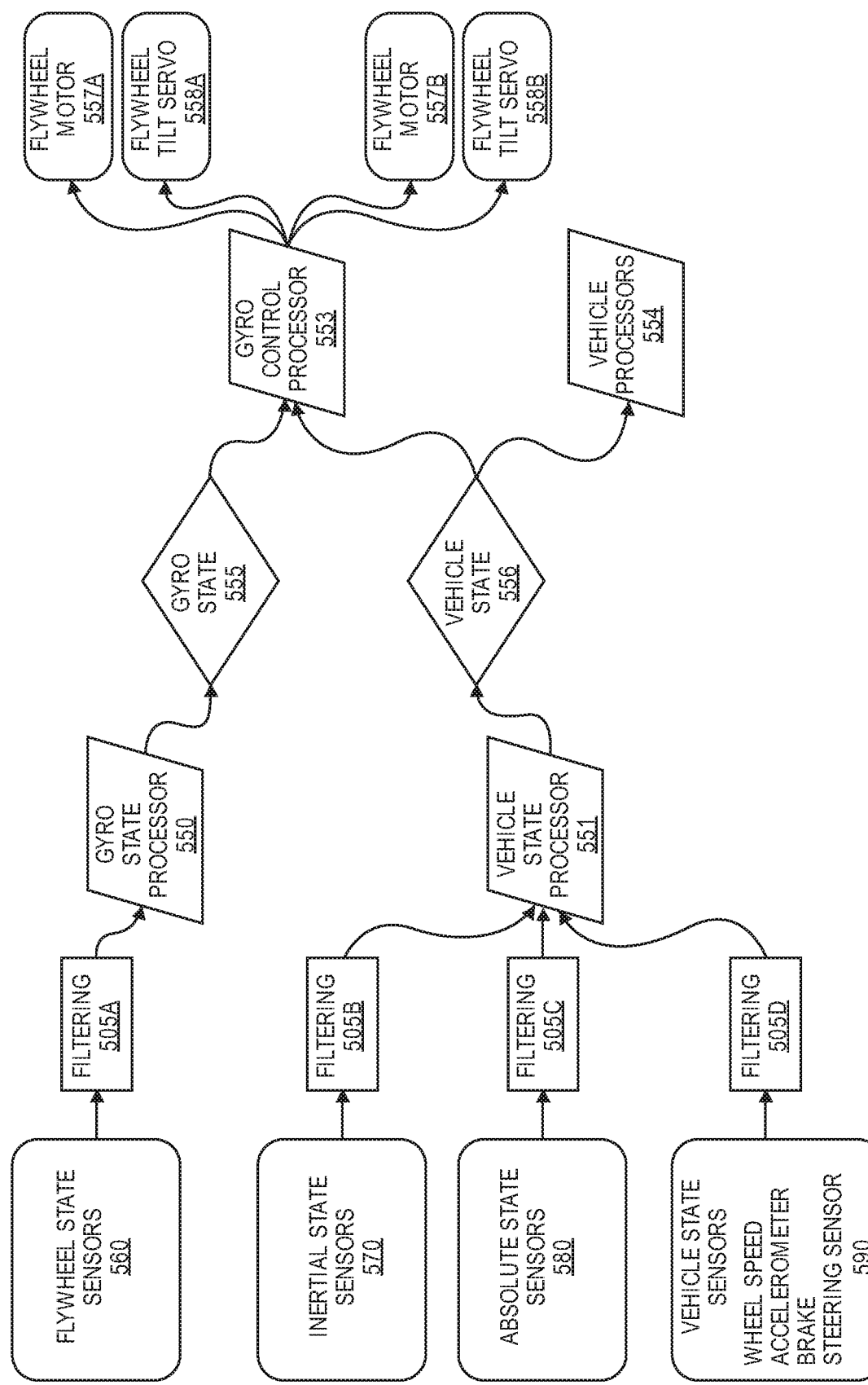
FIG. 5 is an illustration of sensor and control elements for a two-wheeled vehicle according to an embodiment of the invention.

FIG. 5 is an illustration of a control system for a two-wheeled vehicle according to an embodiment. In some embodiments, a gyro state processor 550 is to receive inputs from flywheel state sensors 560 coupled to each flywheel. The flywheel state sensors produce signals indicating important measurements including one or more of flywheel tilt angle relative to the vehicle frame or chassis, flywheel tilt velocity (i.e. the rotational velocity at which the precession motor is rotating the flywheel about its precession axis), and flywheel disk velocity (i.e. the rotation speed of the flywheel disk about its axis of rotation). In some embodiments, the gyro state processor 550 utilizes this information to determine the actual instantaneous magnitude and direction of the moment exerted by gyro stabilizers on the vehicle, determine the health of system components, and provide for internal optimization to allow for extended use of the gyro stabilization system (i.e., gyro state 555).

In some embodiments, a vehicle state processor 551 receives inputs from one or more of vehicle inertial state sensors 570, vehicle absolute state sensors 580, and vehicle state sensors 590 to determine vehicle state 556. Each sensor has an associated noise filter with it 505A, 505B, 505C and 505D. The gyro state 555 and the vehicle state 556 are used by the gyro control processor 553 to control the commands to the flywheel motors 557A and 557B and the flywheel tilt servos 558A and 558B. The vehicle state 556 is used by the vehicle processor 554 to generate commands for the remaining vehicle actuators 559. The inertial state sensors 570 are to produce electronic signals indicating one or more of rotational acceleration and linear acceleration, velocity, and position of the vehicle. The vehicle absolute state sensors 580 are to produce electronic signals indicating one or more of vehicle tilt angle direction and magnitude, as well as vehicle direction of travel, speed over ground and absolute geographic position provided by sensors including an electronic compass and GPS receiver. The vehicle state sensors 590 are to produce electronic signals indicating drive wheel speed (i.e. rotational speed of each of the drive wheels of the vehicle), the brake status (i.e. the rate of decrease of the vehicle drive wheel rotational speeds), and user inputs to the vehicle through the accelerator (via an accelerometer) and brake, and the steering sensor providing the ordered turn radius of the vehicle through a steering unit. The user inputs may comprise input from a driver, a computer program.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein via circuitry, logic, or processor-executed software modules. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

Methods and processes, although shown in a particular sequence or order, unless otherwise specified, the order of the actions may be modified. Thus, the methods and processes described above should be understood only as examples, and may be performed in a different order, and some actions may be performed in parallel. Additionally, one or more actions may be omitted in various embodiments of the invention; thus, not all actions are required in every implementation. Other process flows are possible.

What is claimed is:

1. An augmented traction system for a two-wheeled vehicle (hereafter "vehicle") comprising:
   a CMG (control moment gyroscope) system including a plurality of CMGs to provide a first torque vector to decrease a roll angle of a turn of the vehicle and to increase force on one or more of the wheels of the vehicle on a road surface;
   a steering system for the vehicle, the steering system to determine a steering control for the turn of the vehicle at a particular vehicle speed and roll angle, based on sensor data; and
   an aerodynamic control system to actuate one or more aerodynamic elements of the vehicle, the one or more aerodynamic elements to provide a second torque vector to decrease the roll angle of the vehicle, wherein the aerodynamic control system is to generate an aerodynamic force to force the two-wheeled vehicle downward and increase an available cornering force range of the two-wheeled vehicle while in the turn, and counteract the reduction of the roll angle caused by the CMG system.

2. The vehicle of claim 1, wherein the decrease in roll angle by the CMG system is coordinated with the decrease in roll angle by aerodynamic control system.

3. The vehicle of claim 1, further comprising a counter balance mechanism to shift weight within the vehicle.

4. The vehicle of claim 1, wherein the one or more aerodynamic elements comprise:
   one or more passive aerodynamic elements, including a surface or structure to generate aerodynamic force; or
   one or more active aerodynamic elements, including a mechanism to generate forced air; or
   a combination of one or more passive aerodynamic elements and one or more active aerodynamic elements.

* * * * *